United States Patent [19]

Fisch et al.

[11] Patent Number: 5,375,149

[45] Date of Patent: Dec. 20, 1994

[54] APPARATUS AND METHOD FOR EXTRACTING POWER FROM ENERGETIC IONS PRODUCED IN NUCLEAR FUSION

[75] Inventors: Nathaniel J. Fisch, Princeton, N.J.; Jean M. Rax, Paris, France

[73] Assignee: The United States of America as represented by the United States Department of Energy, Washington, D.C.

[21] Appl. No.: 95,560

[22] Filed: Jul. 26, 1993

[51] Int. Cl.5 .............................................. G21B 1/00
[52] U.S. Cl. .................................... 376/133; 376/132; 376/147
[58] Field of Search ............... 376/123, 124, 131, 132, 376/147, 133

[56] References Cited

U.S. PATENT DOCUMENTS

| | | | |
|---|---|---|---|
| 4,292,124 | 9/1981 | Fisch | 376/132 |
| 4,423,001 | 12/1983 | Fisch | 376/123 |
| 4,425,295 | 1/1984 | Fisch et al. | 376/123 |
| 4,615,861 | 10/1986 | Fisch | 376/133 |
| 5,049,350 | 9/1991 | Bussard et al. | 376/123 |

Primary Examiner—Daniel D. Wasil
Attorney, Agent, or Firm—Daniel D. Park; Thomas G. Anderson; William R. Moser

[57] ABSTRACT

An apparatus and method of extracting power from energetic ions produced by nuclear fusion in a toroidal plasma to enhance respectively the toroidal plasma current and fusion reactivity. By injecting waves of predetermined frequency and phase traveling substantially in a selected poloidal direction within the plasma, the energetic ions become diffused in energy and space such that the energetic ions lose energy and amplify the waves. The amplified waves are further adapted to travel substantially in a selected toroidal direction to increase preferentially the energy of electrons traveling in one toroidal direction which, in turn, enhances or generates a toroidal plasma current. In an further adaptation, the amplified waves can be made to preferentially increase the energy of fuel ions within the plasma to enhance the fusion reactivity of the fuel ions. The described direct, or in situ, conversion of the energetic ion energy provides an efficient and economical means of delivering power to a fusion reactor.

17 Claims, 2 Drawing Sheets

APPARATUS AND METHOD FOR EXTRACTING POWER FROM ENERGETIC IONS PRODUCED IN NUCLEAR FUSION

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

The present invention relates to nuclear fusion reactors, and, more particularly, to an apparatus and method of enhancing the toroidal plasma current and the fuel ion reactivity of a fusion reactor by injecting waves into a toroidal plasma to channel energy from energetic ions directly to electrons and fuel ions.

To achieve ignition or efficient burnup of fuel ions (deuterium and tritium) in a magnetic confinement fusion reactor, a dense plasma must be confined and heated to extremely high temperatures. In a tokamak-type fusion reactor, plasma confinement is obtained by a toroidal magnetic field supplemented by a poloidal magnetic field produced by a toroidal electric current in the plasma itself. This current also serves to heat the plasma by resistive heating ($I^2R$). For a tokamak reactor to operate economically, the toroidal plasma current must be induced efficiently and in long pulses or steady state modes.

Currently, the toroidal plasma current is induced primarily by means of a time varying magnetic field produced by large external transformers. This method, however, suffers in that it is inherently a pulsed method. Other methods of driving the plasma current, as described in U.S. Pat. Nos. 4,425,295 (Fisch et al.) and 4,292,124 and 4,423,001 (Fisch), utilize radio-frequency (rf) waves to selectively heat electrons or minority ions to generate the toroidal current. These methods, though able to produce steady-state plasma current, nonetheless, require the addition of large amounts of external energy.

An additional problem associated with the tokamak is its ability to sufficiently heat the deuterium and tritium fuel ions to achieve substantial fusion reactivity. It is apparent that additional increases in the fusion reactivity will be necessary to obtain an economically feasible tokamak reactor, particularly when the plasma fuel comprises deuterium alone or deuterium and $^3$He. Some of the methods used to increase the fusion reactivity are neutral beam injection, induction of plasma compression and turbulence, and injection of waves at various frequencies and phases to heat the ions. Although some of these methods have been more effective than others, all have the same shortcoming in that they require the addition of large amounts of external energy into the system.

What is needed is a mechanism whereby some of the energy released from nuclear fusion can be converted, in situ, directly to the electrons and fuel ions of the plasma so that the toroidal plasma current may be generated efficiently and continuously and the fusion reactivity of fuel ions increased. The advantage of an in situ energy conversion is that it avoids the inherent inefficiencies associated with the process of extracting the energy released from fusion and then using the extracted energy to generate and deliver useful power back into the plasma. Therefore, even if only a small fraction of the fusion energy can be tapped in situ to drive the toroidal plasma current and enhance fusion reactivity, because of the several-fold energy savings over recirculated power, the savings could mean the difference between a marginal or economically feasible reactor.

An effective means for delivering continuous power to a tokamak reactor has been through the introduction of various waves, such as lower hybrid waves, into the plasma. Lower hybrid waves are a demonstrated, continuous means for driving the plasma current as well as for increasing the reactivity of fuel ions. For instance, when lower hybrid waves are absorbed by electrons traveling in one direction in the toroidal plasma, they gain energy thus enhancing the plasma current. Likewise, when lower hybrid waves are absorbed by the fuel ions, their energies are increased to enhance fusion reactivity.

Unfortunately, it has been thought that in most wave regimes operating in a tokamak reactor, the power delivered to the plasma by the waves becomes diminished because the same waves are also absorbed by energetic ions which are produced by nuclear fusion. It has been thought that energetic ions tend to absorb more wave power than electrons, in part, because the electron velocity distribution is flat in the regions where the wave phase velocities are finite. On the other hand, the energetic ion interaction exhibits no saturation, because, once in resonance, energetic ions remain in resonance even as they gain energy. However, the calculations which explore this severe damping by energetic ions, were made under the assumption that the plasma is infinite and homogeneous. We show, in this invention, that in an inhomogeneous plasma, subjected to properly localized and phased wave power, the energetic ions, instead of damping the wave energy, can actually amplify the wave. The amplification is then transferred directly to the plasma, via wave damping by electrons or fuel ions, to enhance respectively the plasma current and fuel ion reactivity.

In view of the foregoing, the general object of this invention is to provide an apparatus and method of extracting energy from fusion by-products, or energetic ions, and channeling the extracted energy back into the plasma by injecting waves of predetermined frequency and phase into a toroidal plasma.

Another object of this invention is to provide an apparatus and method of injecting waves into a toroidal plasma to channel energy from energetic ions directly to electrons to generate and enhance the toroidal plasma current of a fusion reactor.

Yet another object of this invention is to provide an apparatus and method of injecting waves into a toroidal plasma to channel energy from energetic ions directly to fuel ions to enhance the fusion reactivity of a fusion reactor.

Additional objects, advantages and novel features of the invention will become apparent to those skilled in the art upon examination of the following and practice of the invention.

SUMMARY OF THE INVENTION

To achieve the foregoing and other objects, this invention provides an apparatus and method of extracting power from energetic ions produced by nuclear fusion in a toroidal plasma to enhance respectively the toroidal plasma current and fusion reactivity. Due to the fusion production rate, energetic ions are produced essentially within the central region of the toroidal plasma to create a steep spatial gradient of energetic ions. By injecting waves of predetermined frequency and phase traveling substantially in a selected poloidal direction within the plasma, the energetic ions become diffused in energy and space such that the energetic ions lose energy and amplify the injected waves.

The amplified waves can also be adapted to travel substantially in a selected toroidal direction to increase preferentially the energy of electrons traveling in one toroidal direction which, in turn, enhances or generates a toroidal plasma current. The waves, in addition to satisfying a resonance condition with energetic ions as described above, are adapted to satisfy a resonance condition with electrons traveling substantially in one toroidal direction.

In a further adaptation, the amplified waves can be made to preferentially increase the energy of fuel ions within the plasma to enhance the fusion reactivity of the fuel ions. Although the waves are adapted to satisfy a resonance condition with both energetic ions and fuel ions, two different diffusion paths allow energetic ions to lose energy to the wave and diffuse outwardly from the central region of the plasma while fuel ions gain energy from the wave and diffuse inwardly toward the plasma center.

BRIEF DESCRIPTION OF THE DRAWINGS

The present invention is illustrated in the accompanying drawings where.

DESCRIPTION OF THE PREFERRED EMBODIMENT

Figure 1:
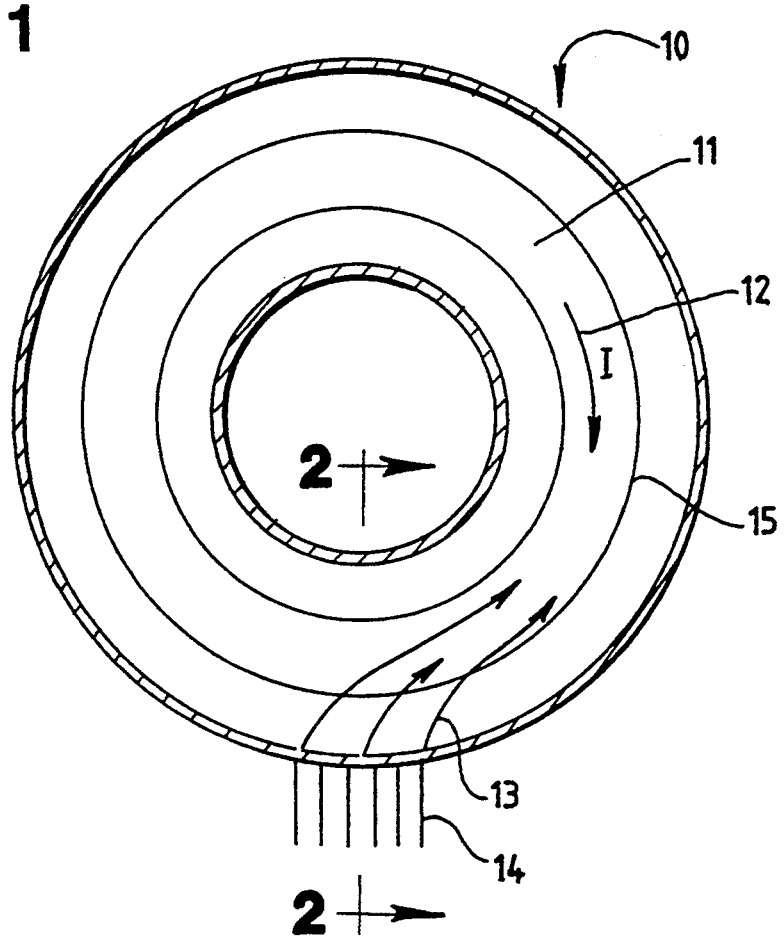
FIG. 1 is a cross-sectional, top-view of a tokamak fusion reactor showing the toroidal plasma therein.

As shown generally in the drawings, the invention provides a method of extracting energy from energetic ions produced by nuclear fusion within a tokamak fusion reactor 10. FIG. 1 is a cross-sectional, top view of the tokamak 10, wherein a toroidal plasma 11 is confined within a strong helical magnetic field created by the superposition of an externally generated toroidal magnetic field with a poloidal magnetic field generated by a toroidal current 12 within the plasma 11. Energy from the tokamak 10 is released when fuel ions, deuterium and tritium, within the toroidal plasma 11 fuse to form energetic ions, $\alpha$-particles and protons, and neutrons.

Energy is extracted from the energetic ions by injecting waves 13 of predetermined frequency and phase into the plasma 11 by means of antennas or wave guides 14 to diffuse the energetic ions towards the periphery 15 of the plasma 11. The energetic ions, while diffusing towards the periphery 15, impart energy to the waves 13 to amplify the waves 13. The amplified waves 13, in turn, convey energy to electrons and fuel ions to enhance respectively, the toroidal plasma current 12 and fuel ion reactivity.

Figure 2:
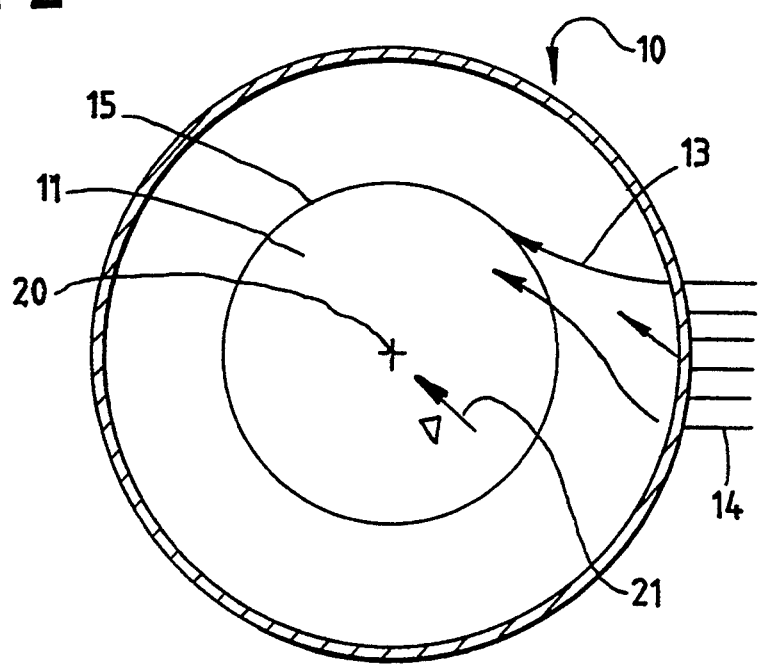
FIG. 2 is a cross-sectional view of the tokamak taken substantially along line 2—2 in FIG. 1.

As shown in FIG. 2, the energetic ions are produced generally within the central region 20 of the toroidal plasma 11 to create a steep spatial gradient 21 of energetic ions. The spatial gradient 21 arises naturally from the fusion production rate which is proportional to the square of the fuel ion density and, approximately, to the square of the plasma temperature. Since heat and particles are lost from the plasma at its periphery 15, both the fuel ion density and plasma temperature is greatest near the plasma center 20. Accordingly, the production of energetic ions is greatest near the plasma center 20 such that the energetic ion density peaks near the center 20 and falls off rapidly towards the plasma periphery 15. The steep gradient provides a source of free energy that may be tapped by allowing the energetic ions to expand radially outward toward the plasma periphery 15.

Figure 3:
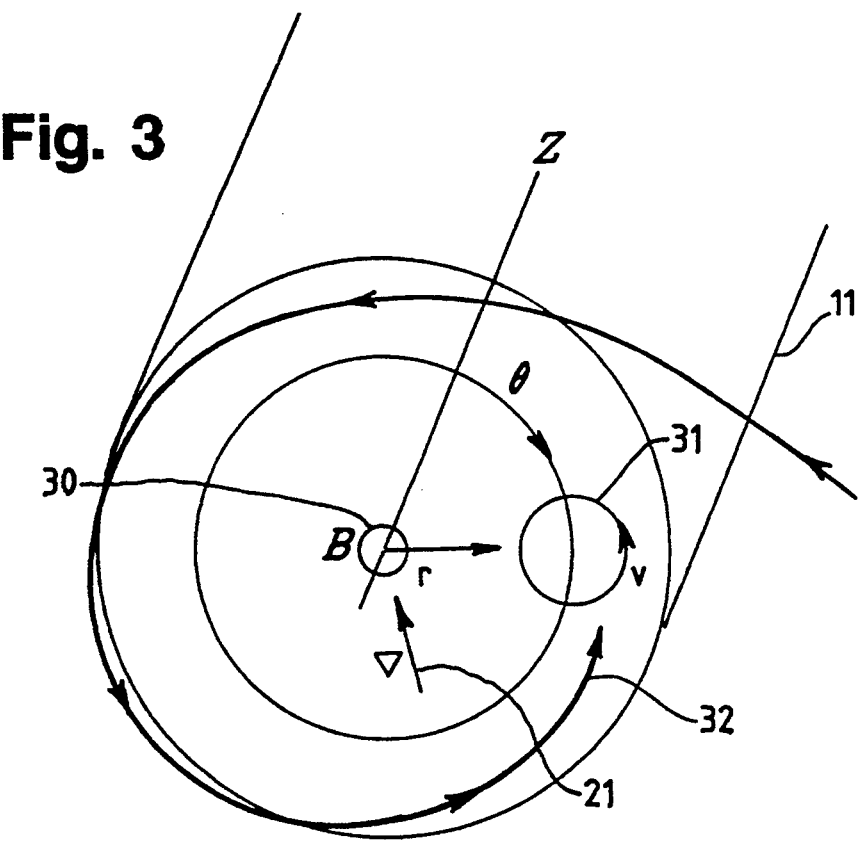
FIG. 3 is a partial, cross-sectional view of the plasma represented in an r-$\theta$-z coordinate system showing the poloidal component of the lower hybrid wave.

However, the free expansion energy of the energetic ions is difficult to harness because the energetic ions are confined within the strong magnetic field which confines the plasma 11. In the absence of external forces, the energetic ions will not expand towards the periphery 15 of the plasma 11, but instead, they will gyrate around the toroidal or z-directed lines of the magnetic field B 30 in what are called Larmor or gyroorbits 31 as shown in FIG. 3, which displays a cross-section of the plasma 11 in an r-$\theta$-z coordinate system. Consequently, these confined energetic ions become diffused primarily by colliding with electrons which are traveling toroidally within the tokamak 10. These collisions, by slowing down the electrons, rob the tokamak reactor 10 of useful energy by reducing the plasma current 12 and the collisional or resistive heating available to the fuel ions.

Nonetheless, it is possible to extract the energy of these energetic ions if they are diffused by a noncollisional means such as by interaction with an intense wave 13 deliberately injected into the tokamak 10 as shown in FIGS. 1 and 2. Under the influence of suitable waves 13, such as an electrostatic wave with substantial poloidal momentum, the centrally located energetic ions would tend to diffuse in energy-configuration space to the less energetic peripheral region 15. Although there may be other, possibly even more suitable, waves 13 for extracting the expansion energy of the energetic ions, in the preferred embodiment described herein, the lower hybrid wave is disclosed. Additionally, the invention herein considers and further discloses $\alpha$-particles since in the first most likely achievable fusion reaction of deuterium-tritium (D-T), $\alpha$-particles will be the primary energetic ions which are produced.

Referring again to FIG. 3, the lower hybrid wave 32 can be made electrostatic with wavenumbers K predominantly in a direction perpendicular to both the magnetic field 30 and the gradient 21 of the energetic ions, which for a tokamak with circular cross section would mean a large $k_\theta$, where $\theta$ is the azimuthal, or poloidal, direction. Additionally, it is possible to concentrate the wave amplitude in the radial direction r to allow the wave 32 to interact with the energetic ions in a nonlinear manner and in the region in which the gradient 21 is greatest.

To illustrate the mechanism by which the energetic ions are diffused, consider, as shown in FIG. 3, a lower hybrid wave 32 traveling along a wave trajectory with wavenumber k in the $\theta$ direction, interacting with $\alpha$-particles in a strong z-directed magnetic field B 30 pointing into the plane of FIG. 3. As described earlier and shown in FIG. 2, the $\alpha$-particles are concentrated towards the central region 20 of the plasma 11 with a gradient 21 in the r direction. The α-particles are magnetically confined in the plasma 11, i.e. $\rho_\alpha/a <1$, where $\rho_\alpha$ is the α-particle gyroradius and a is the minor cross-section of the tokamak 10. The α-particles, however, are not magnetized with respect to the wave 32, i.e. $k_\theta\rho_\alpha>1$, where $k_\theta$ is the wave wavenumber in the poloidal direction. Thus, if due to the wave 32, the α-particle momentum changes by $m_\alpha\Delta v_\theta$, where $m_\alpha$ is the α-particle mass and $v_\theta$ the α-particle poloidal velocity, then the change in the α-particle energy is $\Delta E=-m_\alpha v_\theta\Delta v_\theta$, and the change in the gyrocenter or position of the α-particle in the r-direction is $\Delta r_{gc}=\Delta v_\theta/\Omega_\alpha$, where $\Omega_\alpha=2eB/m_\alpha$ is the gyrofrequency and where e is the charge on a proton. The wave-particle resonance is $\omega=k_\theta v_\theta$, so upon exchanging energy $\Delta E$ with the wave, the α-particle moves $\Delta r_{gc}=\Delta E k_\theta/m_\alpha\Omega_\alpha\omega$.

As can be seen in FIG. 3, in an r-θ-z coordinate system the lower hybrid wave 32 can travel either in the positive or negative θ-direction, meaning that the wave 32 wavenumber $k_\theta$ can be either positive or negative. From the equation above, $\Delta r_{gc}=\Delta E k_\theta/m_\alpha\Omega_\alpha\omega$, it can be readily seen that if the α-particle interacts with a lower hybrid wave 32 traveling in the negative θ-direction, i.e. the wave 32 wavenumber $k_\theta$ is negative, then the α-particle will move radially inward if it gains energy while if it loses energy it will move radially outward. Physically, what is happening is that the α-particle is in resonance with the wave 32 when the α-particle is traveling in the negative θ-direction, or, in other words, on the radially inward portion of its gyroorbit 31, such that if the α-particle is pushed to higher energy, it migrates radially inward while if it loses energy, it migrates radially outward. Precisely the opposite occurs when wave 32 wavenumber $k_\theta$ is chosen to be in the positive θ-direction.

Because of the random nature of wave-particle interactions, the α-particle in interacting with the wave 32 will gain energy as often as it loses energy with the net effect of being diffused in both energy and gyrocenter radius. However, because the radial concentration of the α-particles is near the center 20 of the plasma 11, the diffusion of α-particles in energy-radius space will be on average to larger radius and lower energy when a wave 32 traveling in the negative θ-direction is allowed to interact with the α-particles. The net result is that the wave 32, in absorbing the energy lost by the α-particles, is amplified.

To diffuse the energetic ions and extract their energy as described in the foregoing, lower hybrid waves 32 of predetermined frequency and phase which encircle the plasma center 20 poloidally in the negative θ-direction are injected into the plasma 11. The waves 32 are adapted to satisfy a resonance condition with the energetic ions such that $\omega-k_|v_{i|}-k_\perp v_{i\perp}\leq 0$, where $\omega$ is the wave frequency, $k_|$ is the wave wavenumber parallel to said toroidal magnetic field, $k_\perp$ is the wave wavenumber perpendicular to said toroidal magnetic field, $v_{i|}$ is the ion parallel velocity and $v_{i\perp}$ is the ion perpendicular velocity. The resonance condition ensures that the perpendicular wave phase velocity $\omega/k_\perp$ is less than the energetic ion perpendicular velocity $v_{i\perp}$, as seen by an ion moving with the ion parallel velocity $v_{i|}$, and thus allows the waves 32 to fully interact with the ion.

The lower hybrid wave 32 can be generated by launching rf waves into the plasma 11 be means of waveguides 14 with various toroidal and poloidal phasing as shown in FIGS. 1 and 2. Methods of launching rf waves into a plasma 11 to generate the various waves, such as the lower hybrid wave 32, are well known in the art. Alternate methods of launching rf waves include the use of antenna arrays and other slow wave structures.

The lower hybrid waves 32, having been or while being amplified by the diffusion of energetic ion as described in the foregoing, can be used as a mechanism to provide power, in situ, directly to the toroidal plasma current 12. Because lower hybrid waves 32 traveling poloidally in the θ-direction can also travel in the toroidal or z direction, they can enhance and/or generate the toroidal plasma current 12 by increasing the energy of electrons traveling in one toroidal direction. To increase preferentially the energy of the electrons, the injected lower hybrid waves 32, while in resonance or possibly subsequent to being in resonance with energetic ions, are adapted to also satisfy a resonance condition with the electrons, such that $\omega-k_|v_{c|}=0$, where $\omega$ is the wave frequency, $k_|$ is the wave wavenumber parallel to the toroidal magnetic field, and $v_{c|}$ is the parallel velocity of electrons. The waves 32 are launched by an endfire array of waveguides such that the wave parallel phase velocity $\omega/k_|$ is substantially unidirectional and in the direction opposite the desired flow of toroidal current 12.

To efficiently generate the plasma current 12, damping of the lower hybrid waves 32 by fuel ions must be avoided. To avoid damping on the bulk fuel ion population, the wave phase velocity in the direction perpendicular to the magnetic field must be made much greater than the thermal velocity of the bulk fuel ions, i.e. $\omega/k_\perp>v_{Tf}$ is the average thermal velocity of the fuel ions and $k_\perp$ is the perpendicular wavenumber which in the main region of wave-particle interaction is chosen to be substantially in the poloidal direction. Since only fuel ions with perpendicular speeds much greater than that of the perpendicular wave phase velocity can resonate, very few fuel ions will participate in the damping.

The amplified lower hybrid wave 32 can also be used to enhance the fusion reactivity of the plasma 11 by damping on fuel ions instead of electrons. To damp on fuel ions the lower hybrid wave 32 is adapted to satisfy a resonance condition with fuel ions such that $\omega-k_|v_{f|}-k_\perp v_{f\perp}\leq 0$, where $\omega$ is the wave frequency, $k_|$ is the wave wavenumber parallel to the toroidal magnetic field, $v_{f|}$ is the fuel ion parallel velocity, $k_\perp$ is the wave wavenumber perpendicular to the magnetic field, and $v_{f|}$ is the fuel ion perpendicular velocity. For optimal wave damping by fuel ions, the wave 32 perpendicular phase velocity should be about four times the fuel ion perpendicular velocity, $\omega/k_\perp\sim 4v_{Tf}$. Also, the wave 32 parallel velocity $\omega/k_|$ should be large enough to avoid electron damping in comparison to ion damping.

Figure 4:
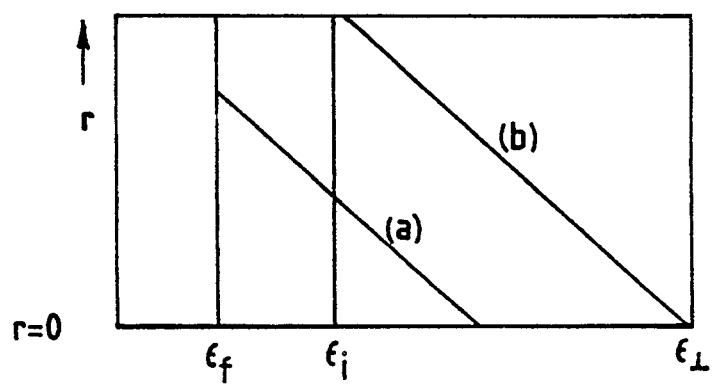
FIG. 4 is a graph of the ion perpendicular energy versus the radial distance from the center of the plasma showing typical ion diffusion paths.

The foregoing damping of fuel ions is possible because, although fuel ions are diffused in space and energy in essentially the same manner as energetic ions, the energetic ions tend to lose energy and move radially outwardly while the fuel ions tend to gain energy and move radially inwardly. This is due to the fact that the energy and density distribution of fuel ions are different from that of energetic ions. For example, as shown in FIG. 4, both paths (a) and (b) are typical diffusion paths of ions that interact with a wave with poloidal phase velocity $\omega/k_\theta$, wherein r is the ion radial distance from the center of the plasma and $\epsilon_\perp$ is the ion perpendicular energy. Here $\epsilon_f=m_f(\omega/k_\theta)^2/2$ and $\epsilon_i=m_i(\omega/k_\theta)^2/2$ are, respectively, the threshold energies for interaction of the wave with ions with masses $m_f$ and $m_i$. Therefore, if the wave poloidal velocity is chosen such that $\epsilon_f \approx 80-100$ KeV, in a D-T fusion reactor operating at a temperature about 20 KeV, it is clear that not many fuel ions will have energy greater than $\epsilon_f$. Thus, upon interaction with the waves 32, the fuel ions tend to gain energy and move inwardly while the energetic ions, in this case α-particles, being born at about 3.5 MeV and initially having substantially greater energies than $\epsilon_i$ are much less likely to gain energy. Moreover, the energetic ions being concentrated near the tokamak center 20, or r=0, are more likely to diffuse along (b) to lower energy $\epsilon_i$ than fuel ions. Energetic ions, on the other hand, are more likely to diffuse along (a) to higher energy and smaller radii. In this manner, through the wave intermediary, energy from the energetic ions are transferred to the fuel ions to increase the fusion reactivity of the plasma 11.

In the embodiment disclosed thus far, the techniques of using energetic ion energy to enhance the plasma current 12 or fusion reactivity have been disclosed. However, in a further adaptation of the invention as disclosed herein, it is possible to use the energetic ion energy to simultaneously increase fusion reactivity while generating or enhancing the toroidal plasma current 12. One such known method is described in U.S. Pat. No. 4,423,001 (Fisch) entitled, "System and Method for Generating Current by Selective Minority Species Heating." To simultaneously increase fuel reactivity while generating plasma current, waves 32 of predetermined frequency and phase traveling in one poloidal direction and in one toroidal direction are injected into the plasma 11 which has been prepared to includes both minority and majority ions having different charge states. The waves are injected such that they are resonant with superthermal minority ions, such that $(\omega - \Omega_m)/k_| \approx 4v_{Tm}$, where $\Omega_f$ is the minority fuel ion gyrofrequency and $v_{Tm}$ the minority fuel ion thermal velocity. The waves 32, while or subsequent to extracting energy from energetic ions, are preferentially absorbed by minority species ions traveling in one toroidal direction which increases the energy of the minority ions and serves to heat the minority ions and generate and/or enhance the toroidal plasma current 12.

To maintain a steep spatial gradient of energetic ions and prevent diffusion of energetic ions back into the central region 20 of the plasma 11, it is advantageous to remove the energetic ions that diffuse into the peripheral region 15 of the plasma 11. Accordingly, in the preferred embodiment of the invention, an absorbing boundary at the low-energy end of the diffusion path would efficiently remove energetic ions and allow continuous diffusion of energetic ions from the central region 20 of the plasma 11 to its periphery 15. Absorbing boundaries may be effectuated by ash removal schemes which remove energetic ions as they approach the periphery 15 of the plasma 11. Ash removal schemes such as the use of diverter plates to skim off the outer layer of plasma 11 or by inducing a magnetic ripple or turbulence on the outer surface of the plasma without causing significant interior agitation are known and effective methods of ion removal.

Under favorable circumstances, namely in conjunction with ash removal schemes, the invention, as described in the preferred embodiment herein, should be able to extract much of the perpendicular energy of the energetic ions. The consequence of being able to tap the energy of energetic ions as described in the invention is very advantageous for tokamak operations because the energy gain is obtained by a direct, in situ, conversion of the ion energy as contrasted with the traditional method of converting fusion energy to heat, then to electricity, and then to lower hybrid waves 32 to power the current drive or to increase fuel ion reactivity. Note that the energy savings in a D-T tokamak reactor by the use of the invention herein can be large. For example, if 5% of the total fusion energy is to be recirculated to drive the plasma current 12, and if 10-20% of the α-particle power, which is approximately 20% of the total fusion energy, can be channeled to directly to the plasma current 12, then the recirculating power can be reduced to only about 1-3% of the total fusion energy. The efficiency of the current drive mechanism is enhanced by a factor of 1.7 to 5.

Another advantage is that since, by the practice of this invention, energetic ions are diffused to the periphery 15 of the plasma 11, unwanted helium ash is removed from the plasma center 20 and automatically purifies the plasma core of spent fuel. Further, since the amount and energy of the energetic ions in the plasma 11 is reduced, there is less energy available which can create unwanted instabilities in the plasma 11. Yet another advantage of the invention is that the removal of energy from the energetic ions will reduce the ion pressure and allow the magnetic field required to contain the plasma to be smaller and thus be cheaper to generate. Likewise, if the extracted ion energy is channeled to the fuel ions without heating the electrons, the total electron pressure will naturally be reduced, bringing a corresponding reduction in the magnetic field required to contain the plasma.

A limitation of the power that may be extracted by this invention is the fact that only 20% of the total fusion power from a D-T reaction is available in the form of energetic ions. Nonetheless, advanced fuel reactors utilizing deuterium-deuterium (D-D) and D-$^3$He reactions should be able to utilize the method of this invention with even greater effect since energetic ions dominate the total fusion power of such advanced reactors.

The foregoing description of a preferred embodiment of the invention has been presented for purposes of illustration and description. It is not intended to be exhaustive or to limit the invention to the precise form disclosed. For example, waves used to diffuse the energetic ions need not be limited to the lower hybrid wave. There may be other more efficient and suitable waves for extracting energy from the energetic ions. The embodiment described herein explains the principles of the invention so that others skilled in the art may practice the invention in various embodiments and with various modifications as suited to the particular use contemplated. It is intended that the scope of the invention be defined by the claims appended hereto.

The embodiment and method of the invention in which an exclusive property or privilege is claimed are defined as follows:

1. A method of extracting energy from energetic ions produced by nuclear fusion in a toroidal plasma comprising the steps of:

immersing said toroidal plasma in a steady-state toroidal magnetic field;

preparing said plasma such that said energetic ions are produced essentially in the central region of said toroidal plasma; and injecting waves of predetermined frequency and phase traveling substantially in a selected poloidal direction within said toroidal plasma to diffuse the energetic ions in energy and space such that said energetic ions lose energy and amplify said waves; said injected waves satisfying a resonance condition with energetic ions such that $\omega - k_| v_{i|} - k_\perp v_{i\perp} \leq 0$, is the wave frequency, $k_|$ is the wave wavenumber parallel to said toroidal magnetic field, $k_\perp$ is the wave wavenumber perpendicular to said toroidal magnetic field, $v_|$ is the ion parallel velocity and $v_{i\perp}$ is the ion perpendicular velocity.

2. The method of claim 1 and said injected waves generated by injecting radio-frequency power of predetermined frequency and phase into said toroidal plasma.

3. The method of claim 1 and said injected waves including lower hybrid waves.

4. The method of claim 1 and including the step of removing energetic ions near the outer periphery of the toroidal plasma.

5. The method of claim 1 wherein said injected waves travel substantially in a selected toroidal direction and increase preferentially the energy of electrons traveling substantially in one toroidal direction to generate a toroidal plasma current.

6. The method of claim 5 wherein said injected waves are substantially electrostatic and satisfy a resonance condition with both energetic ions and electrons;

said resonance condition with the electrons satisfying $\omega - k_| v_{e|} = 0$, where $\omega$ is the wave frequency, $k_|$ is the wave wavenumber parallel to said toroidal magnetic field, and $v_{e|}$ is the electron parallel velocity.

7. The method of claim 1 wherein said injected waves increase preferentially the energy of fuel ions within the plasma to increase the fusion reactivity of the fuel ions.

8. The method of claim 7 wherein said injected waves are substantially electrostatic and satisfy a resonance condition with both energetic ions and fuel ions;

said resonance condition with fuel ions satisfying $\omega - k_| v_{f|} - k_\perp v_{f\perp} \leq 0$, where $\omega$ is the wave frequency, $k_|$ is the wave wavenumber parallel to said toroidal magnetic field, and $v_{f|}$ is the fuel ion parallel velocity, $k_\perp$ is the wave wavenumber perpendicular to the magnetic field, and $v_{f\perp}$ is the fuel ion perpendicular velocity.

9. The method of claim 1 wherein said toroidal plasma includes both minority and majority fuel ions having differing charge states, and wherein said injected waves travel substantially in a selected toroidal direction and increase preferentially the energy of minority fuel ions traveling substantially in one toroidal direction to generate toroidal plasma current and increase fusion reactivity of the minority fuel ions.

10. The method of claim 9 wherein said injected waves are resonant with superthermal minority fuel ions such that $(\omega - \Omega_m)/k_| = 4v_{Tm}$, where $\omega$ is the wave frequency, $\Omega_m$ is the minority fuel ion gyrofrequency, $k_|$ is the wave wavenumber parallel to the toroidal magnetic field, and $v_{Tm}$ is the average thermal velocity of the minority fuel ions.

11. An apparatus for extracting energy from energetic ions produced by nuclear fusion in a toroidal plasma comprising:

means for immersing said toroidal plasma in a steady-state toroidal magnetic field;

means for preparing said plasma such that said energetic ions are produced essentially in the central region of said toroidal plasma; and means for injecting waves of predetermined frequency and phase traveling substantially in a selected poloidal direction within said toroidal plasma to diffuse the energetic ions in energy and space such that said energetic ions lose energy and amplify said waves;

said means for injecting waves adapted such that injected waves satisfy a resonance condition with energetic ions such that $\omega - k_| v_{i|} - k_\perp v_{i\perp} \leq 0$, where $\omega$ is the wave frequency, $k_|$ is the wave wavenumber parallel to said toroidal magnetic field, $k_\perp$ is the wave wavenumber perpendicular to said toroidal magnetic field, $v_{i|}$ is the ion parallel velocity and $v_{i\perp}$ is the ion perpendicular velocity.

12. The apparatus of claim 11 wherein said means for injecting waves is adapted such that injected waves travel substantially in a selected toroidal direction and increase preferentially the energy of electrons traveling substantially in one toroidal direction to generate a toroidal plasma current.

13. The apparatus of claim 12 wherein said means for injecting waves is adapted such that injected waves are substantially electrostatic and satisfy a resonance condition with both energetic ions and electrons;

said resonance condition with the electrons satisfying $\omega - k_| v_{e|} = 0$, where $\omega$ is the wave frequency, $k_|$ is the wave wavenumber parallel to said toroidal magnetic field, and $v_{e|}$ is the electron parallel velocity.

14. The apparatus of claim 12 wherein said means for injecting waves is adapted such that injected waves increase preferentially the energy of fuel ions within the plasma to increase the fusion reactivity of the fuel ions.

15. The apparatus of claim 14 wherein said means for injecting waves is adapted such that injected waves are substantially electrostatic and satisfy a resonance condition with both energetic ions and fuel ions;

said resonance condition with fuel ions satisfying $\omega - k_| v_{f|} - k_\perp v_{f\perp} \leq 0$, where $\omega$ is the wave frequency, $k_|$ is the wave wavenumber parallel to said toroidal magnetic field, and $v_{f|}$ is the fuel ion parallel velocity, $k_\perp$ is the wave wavenumber perpendicular to the magnetic field, and $v_{f\perp}$ is the fuel ion perpendicular velocity.

16. The apparatus of claim 11 wherein said toroidal plasma includes both minority and majority fuel ions having differing charge states, and wherein said means for injecting waves is adapted such that injected waves travel substantially in a selected toroidal direction and increase preferentially the energy of minority fuel ions traveling substantially in one toroidal direction to generate toroidal plasma current and increase fusion reactivity of the minority fuel ions.

17. The apparatus of claim 16 wherein said means for injecting waves is adapted such that injected waves are resonant with superthermal minority fuel ions such that $(\omega - \Omega_m)/k_| \simeq 4v_{Tm}$, where $\omega$ is the wave frequency, $\Omega_m$ is the minority fuel ion gyrofrequency, $k_|$ is the wave wavenumber parallel to the toroidal magnetic field, and $v_{Tm}$ is the average thermal velocity of the minority fuel ions.

* * * * *